United States Patent
Aschauer

[11] 3,833,100
[45] Sept. 3, 1974

[54] CONTROL SYSTEM FOR A POWER TRANSMISSION CLUTCH

[75] Inventor: George R. Aschauer, Racine, Wis.
[73] Assignee: Twin Disc, Incorporated, Racine, Wis.
[22] Filed: Jan. 2, 1973
[21] Appl. No.: 319,989

[52] U.S. Cl.......... 192/85, 192/85 AA, 192/103 FA, 192/106 F
[51] Int. Cl............................................. F16h 3/44
[58] Field of Search.......... 192/83, 85 AA, 106 F, 192/103 FA; 188/107, 106 P

[56] References Cited
UNITED STATES PATENTS

| | | | |
|---|---|---|---|
| 2,328,091 | 8/1943 | Nutt et al. | 192/106 F |
| 2,726,748 | 12/1955 | Quistgaard et al. | 192/106 F |
| 3,473,634 | 10/1969 | Strifler et al. | 188/106 P |
| 3,477,549 | 11/1969 | Barten | 188/106 P |
| 3,680,398 | 8/1972 | Schneider | 192/103 FA |

Primary Examiner—Samuel Scott
Assistant Examiner—Wesley S. Ratliff, Jr.
Attorney, Agent, or Firm—James E. Nilles

[57] ABSTRACT

A control system for a fluid operated clutch, which system includes an actuating chamber for the shiftable clutch actuating piston, and which chamber has a floating ring therein that divides the chamber into two separate chamber portions. Clutch actuating high pressure fluid is admitted to both of the chamber portions, each chamber portion having a separate pressure fluid source. Both of the chamber portions are pressurized at the same time so that in the event one of the sources of fluid pressure or its fluid line leading to its chamber portion become inoperative, the clutch can still be maintained in full engagement by means of the other pressurized chamber portion. This positive clutch engagement is used for operation of a water craft for example, at high speeds say over 1,800 R.P.M. The control system also provides a centrifugally operated valve on the output side of the clutch and fluid pressure is directed to the centrifugal valve by means of an operator control modulating valve. This centrifugally operated valve and its modulating control valve are used at lower or maneuvering speeds of the craft, for example under 1,800 R.P.M., by means of which the clutch can be clamped up in various degrees, that is to say, the clutch can be modulated to provide various degrees of slipping and consequently, transmission of the power through the clutch.

8 Claims, 4 Drawing Figures

CONTROL SYSTEM FOR A POWER TRANSMISSION CLUTCH

BACKGROUND OF THE INVENTION

The invention relates to power transmissions of the type having a multiple friction plate clutch for disengagably connecting two parts of a transmission. Clutches of this type are hydraulically actuated by high pressure fluid introduced into an actuating chamber and which causes shifting of the clutch actuating piston to cause clamp-up of the inter-leaved friction plates.

One example of such a prior art, hydraulically actuated friction type clutch is shown in the U.S. Pat. No. 3,352,395 to Hilpert issued Nov. 14, 1967 and entitled "Friction Clutch having Centrifugally Operated Valve Means" and wherein a centrifugal valve is located in the output member so as to insure a constant output speed of the clutch.

SUMMARY OF THE INVENTION

The present invention provides a control system for a hydraulic actuating friction type clutch of a power transmission, which control system includes a clutch actuating chamber that is pressurized by the fluid to cause a clutch actuating piston to clamp-up the inter leaved clutch plates and thereby engage the clutch. One aspect of the invention relates to the piston actuating chamber in which a floating ring is slideably mounted so as to divide the chamber into two separate chamber portions, each of which can be pressurized from its own separate source of pressure fluid. Pressurization of both chamber portions at the same time causes positive clutch engagement and engagement of the clutch is maintained even if one chamber portion loses its pressure due to malfunction or non-function of one of the sources of pressure fluid. This positive clutch engagement is used for high speed operation, say for example, over 1,800 R.P.M.

Another aspect of the invention relates to a control system of the above type including a centrifugally operated valve in the output member, that is on a down stream side of the clutch, and which centrifugal valve has its separate source of pressure fluid and modulatable control valve. This centrifugal valve acts to pressurize the clutch actuating chamber so as to modulate the clutch; that is to say, so as to permit the clutch to slippingly engage in various degrees to result in a constant output speed of the clutch. This modulation of the clutch by means of the centrifugal valve is used at lower or maneuvering speeds, say for example, below 1,800 R.P.M. of the output shaft.

The present invention thus provides a control system which is operable in two phases, the first phase being a modulating phase of the clutch wherein the operator can control the degree of slipping of the clutch so as to maneuver the craft and also to provide a constant output speed of the power shaft dependent upon the setting of the modulating valve. The second phase of operation is for higher speeds and in which the clutch actuating chamber is fully pressurized by means of simultaneously pressurized two chamber portions each having their own separate source of fluid. Under the latter operating condition, in the event one of the sources of fluid becomes inoperative due to damage or other malfunction, the clutch nevertheless remains fully engaged due to the pressure in the other chamber portion.

These and other objects and advantages of the present invention will appear hereinafter as this disclosure progresses, reference being had to the accompanying drawings.

DESCRIPTION OF A PREFERRED EMBODIMENT

Figure 4:
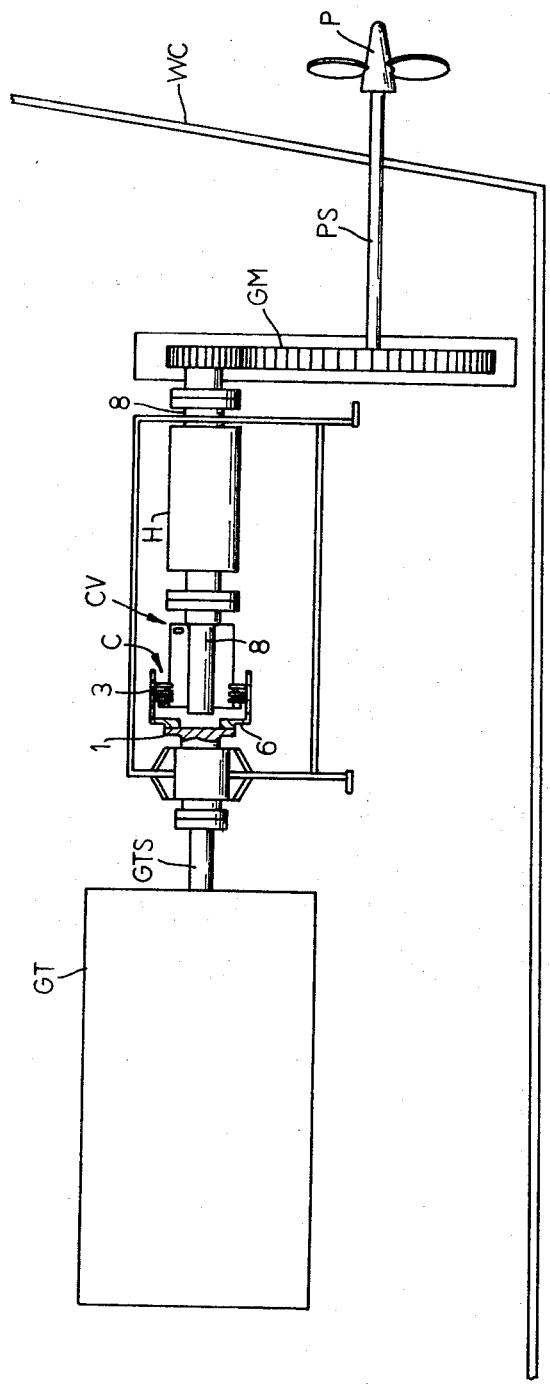
FIG. 4 is a schematic view showing the present invention when used in a water craft.

The power transmission provided by the present invention finds particular utility when used in water craft for example, and wherein the high speed gas turbine engine GT (FIG. 4) has its power shaft GTS connected to an intput member 1 of the transmission. The transmission, to be described, includes the output shaft 8 which is connected to the gear mechanism GM which in turn drives a propeller shaft to which is attached the propeller P.

In such an environment where high horsepower loads are transmitted at high speed, a fail-safe clutch is a necessity. The present transmission is shown as being driven by a gas turbine engine developing, for example, 35,000 horsepower at a speed of say 3,600 revolutions per minute. Heretofore, friction type clutches have not been acceptable in transmitting such loads. However, with the present invention, transmission of such loads with the required degree of safety is assured.

In any event, the power input member 1 includes an annular drum 3 to which are slideably splined in an axial direction the friction plates 4. The friction plates 4 are interleaved with other friction plates 5 which are slideably splined in an axial direction on the hub 6 which in turn is splined at 7 to the output shaft 8.

The clutch C provided by the interleaved clutch plates is actuated by fluid pressure operating means FM which includes an axial slideable annular piston 10 having an annular skirt 10a that slides over a radially extending member 11 having a cylindrical central hub 13 which is axially fixed on shaft 8. More specifically, the sliding piston 10 forms a sliding seal fit with outer surface 12 and the radial inner hub 13 and defines therewith the clutch actuating annular chamber 15. The clutch actuating chamber 15 is divided into two annular chamber portions 16 and 17 by means of the floating, annular ring 18 that moves in an axial direction in the chamber 15 and is in sealing and sliding engagement with the inner and outer cylinder walls of the chamber 15.

Generally, fluid passages are provided, as will be described, for conducting pressure fluid separately to each of the chamber portions 16, 17, and also to a centrifugally operated valve, and to various parts of the clutch to be lubricated. As will be referred to, these passages are arranged in pairs and in diametrically opposed relation relative to the rotating shaft and the associated parts. In this manner, dynamic balance of the high rotational speed transmission is enhanced.

One part of the control system will now be described which is used to cause positive clutch engagement. This part of the system is for high output rotational speeds of, for example, over 1,800 R.P.M.

Chamber portion 16 is supplied with pressure fluid via the two diametrically opposed, radially extending ports 20, two rifle drilled passages 21 in the shaft 8, the two radially extending passages 22, and groove 22a communicating with conduit 23 connected to a high horsepower, manually operated selector valve 25.

The other clutch actuating chamber portion 17 is similarly furnished with pressure fluid via the two radially extending ports 27, the two rifle drilled passages 28, two radial ports 29, and conduit 30 which also communicates with the valve 25. Both chamber portions 16 and 17 are simultaneously pressurized by fluid from valve 25 as will appear.

Pressure fluid is furnished to valve 25 from sump S by means of a fluid pump P which is driven by an electric motor E. The pressurized fluid passes through a filter 32, a high pressure regulating valve 33, and conduits 34 and 35. Conduit 35 communicates with valve 25 so that when the valve 25 is in the position shown in FIG. 1, pressure fluid flows from conduit 35 directly through valve 25 and to conduit 23 for pressurizing clutch chamber portion 16.

Pressure fluid is also furnished to valve 25 from a separate source in the form of fluid pump P1 which is driven by an electric motor E1 and which delivers pressure fluid through filter 40, high pressure regulating valve 41 and then through conduit 42 to the valve 25. When the valve 25 is in the position shown in FIG. 1, pressure fluid flows directly from conduit 42, through the valve 25, and to conduit 30 where it pressurizes chamber portion 17.

Thus, chamber portions 16 and 17 each have their own separate source of fluid pressure, pumps P and P1, respectively. As mentioned, when the valve 25 is in the position shown in FIG. 1, both chamber portions 16 and 17 are filled, causing positive clutch engagement.

It will be noted that an orifice 36 is provided in the wall of piston 10, and which communicates with chamber portion 16 and acts to bleed fluid from chamber portion 16. Another orifice 37 is provided for chamber portion 17. Thereby the chamber portions 16 and 17 are bled regardless of the axial position of the annular ring 18 located therebetween.

The above described system, as mentioned, provides positive clutch engagement and is used for high, generally continuous speeds. This system is controlled by the high horsepower selector valve 25 which pressurizes both chamber portions 16 and 17 simultaneously. The axially shiftable ring 18 can be in any axial position and the pressure in chamber portions 16 and 17 may not be identical due to frictional resistance of the sealing rings, the conduits or pressure differences in the pumps. If both pumps P and P1 are disabled, the orifices 36 and 37 would eventually drain chamber 15 and cause clutch disengagement. The size of orifices 36 and 37 will determine how quickly the clutch would release under that situation. The orifices may be sized for example, to cause clutch release in 33 seconds which would give the operator time to shut off the fuel to the engine and prevent it from running away and exploding.

Means are provided for pumping lubricating fluid to various parts of the transmission and for cooling the clutch plates. This is accomplished also by pumps P and P1, which provide pressurized fluid, at a lower pressure through regulators 33 and 41, via conduits 44 and 45, respectively, to a conduit 46 which then communicates via annular groove 46a, two radial ports 46b, passage 47, and the large central passage 48 in the shaft 8, and from which various portions of the transmission are lubricated such as bearings (not shown) and from which the clutch plates 4 and 5 can be cooled via passages 8a, 8b, and 8c.

The number of clutch plates 4 and 5 used may be varied by changing the length of the annular spaces 8d. The spaces may be eliminated if its space is to be filled with plates for maximum power transmission.

Conventional collector rings 50, 50a and 50b are provided and in which the various annular grooves for the fluid are formed. These rings "float" on the shaft, that is, the flexible o-rings 50c seal between these collector rings and the housing H so as not to interfer with the function of the shaft bearings B.

Another part of the control system of the present invention is used for modulating the clutch, for example at speeds of less than 1,800 R.P.M., i.e., for maneuvering the craft. This part of the system generally includes an operator controlled modulating valve MV which is in communication with the centrifugally operated control valve CV. This clutch modulating system is inoperative during operation of the previously described positive clutch engagement system due to the fact that pressure in chamber portion 16 acts through port 93 on the radially inner end of the radially shiftable valve element 72, to now be described in detail.

Figure 2:
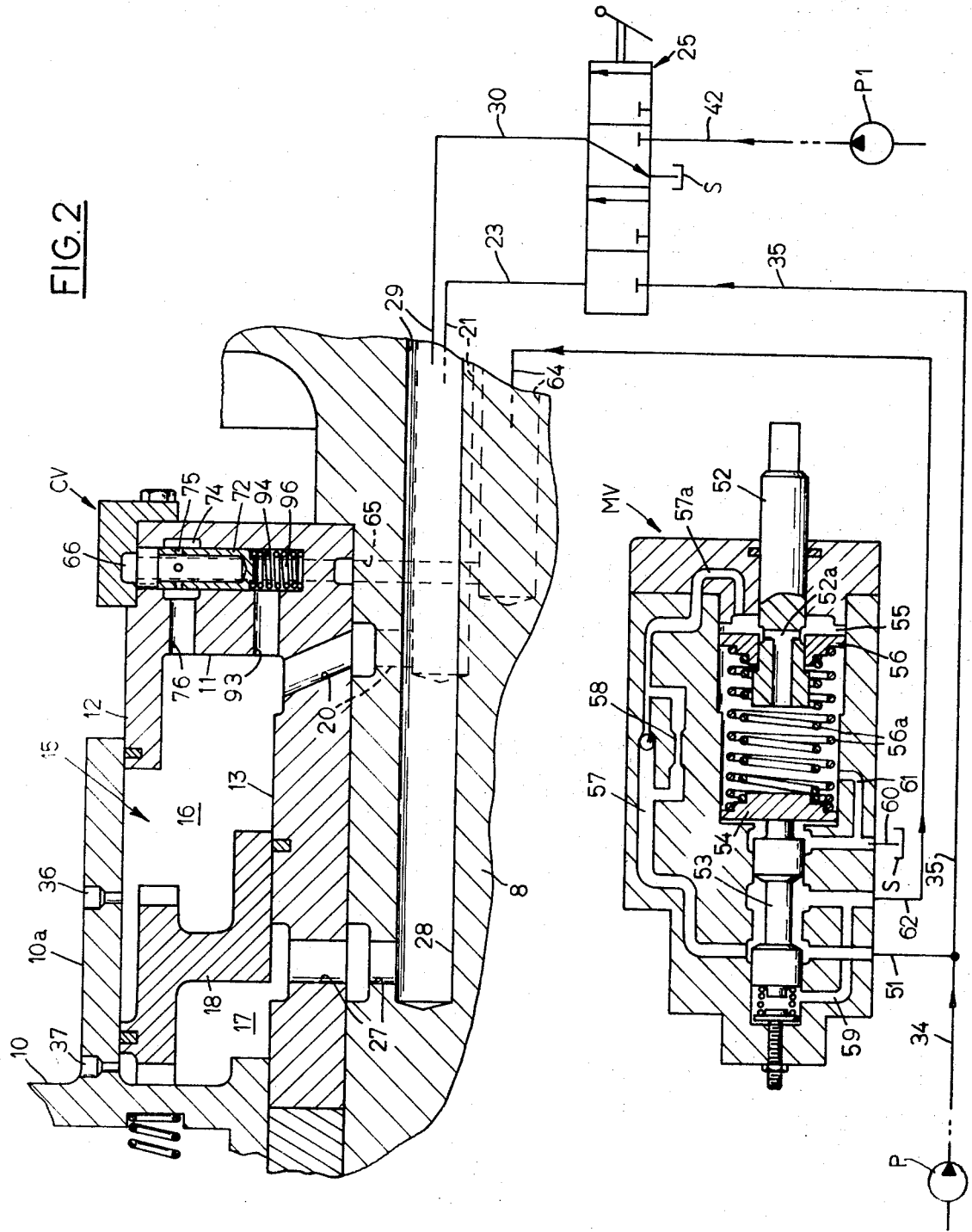
FIG. 2 is a schematic view of portions of the device shown in FIG. 1, on an enlarged scale, but showing the position of the valves when the modulating valve and centrifugal valve is operative to control the modulation of the clutch; the high horsepower selector valve is in the closed position so that the two separate sources of fluid pressure for the chamber portions are inoperative to pressurize the clutch actuating chamber.

The pump P furnishes pressurized fluid via conduit 51 to the modulating valve MV. This modulating valve may be of the type shown in U.S. Pat. No. 3,621,955, issued Nov. 23, 1972 and assigned to an assignee common with this application. The modulating valve includes an operating stem 52 which determines the position of the spool 53. More specifically, the position of the spool 53 is determined by the action of a piston 54 abutting thereagainst. A regulating chamber 55 is formed between a piston 56 slideable on stem 52 and the end of the housing. The position of the piston 54 is influenced by the operating stem 52 acting through springs 56a. When the operating stem 52 is urged to the left as shown in FIG. 2, the spool 53 is shifted a certain amount to the left thereby admitting fluid to flow in a corresponding amount from inlet 51 to outlet conduit 62.

The valve MV also includes a by-pass passage 57 which leads from the inlet passage 51 to the regulating chamber 55 and pressure in this by-pass passage, when the stem 52 is pushed, acts as a power assist for the manually controlled valve operating stem 52. The valve MV operates to permit pressure fluid to pass via orifice 58, passage 57a and into the regulating chamber 55 behind the spring force piston 56.

Figure 1:
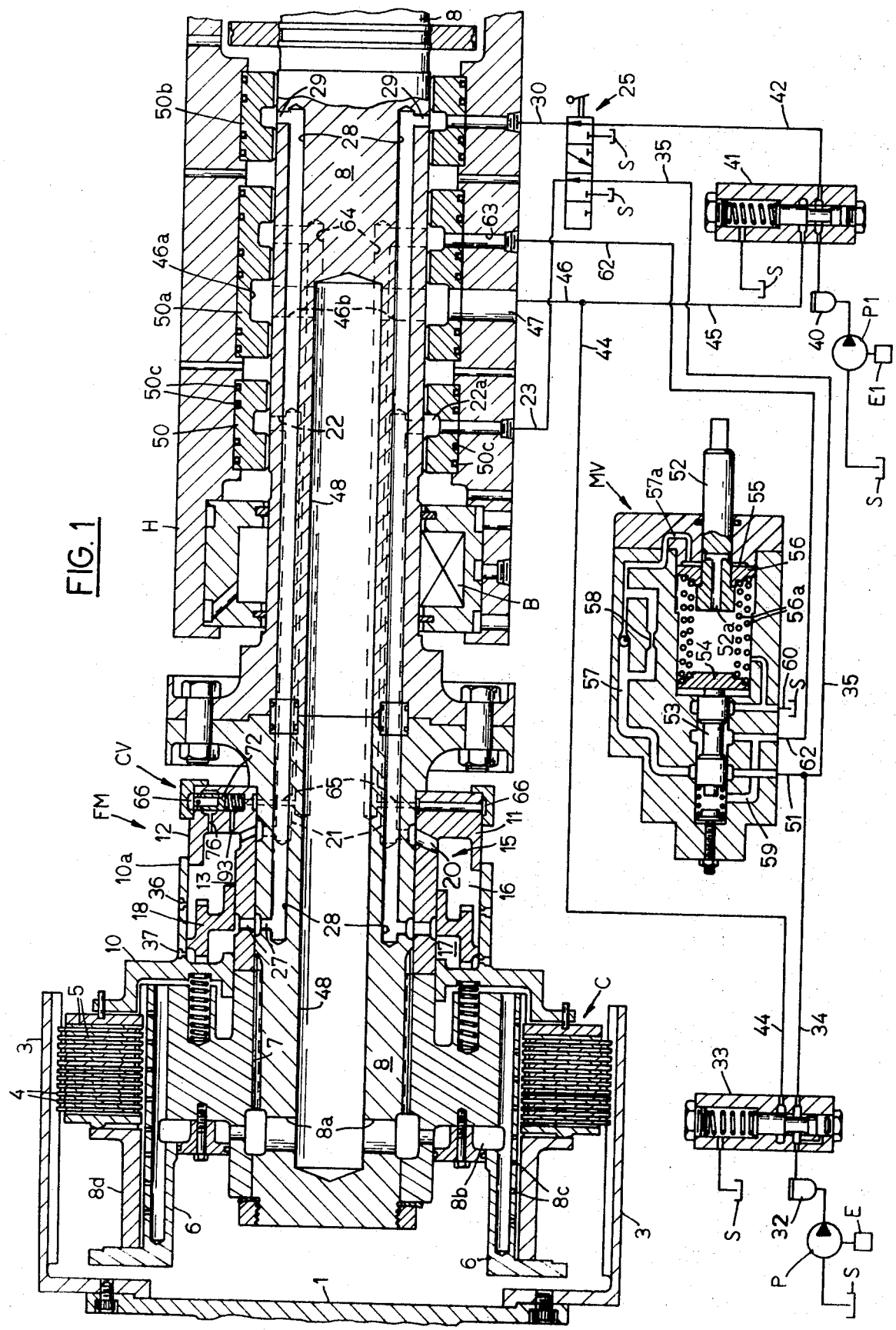
FIG. 1 is a longitudinal cross sectional view through a power transmission embodying the present invention, certain parts being shown as removed or broken away for the sake of clarity, and showing the clutch in the engaged position, the view furthermore showing the fluid valves and fluid pressure sources in schematic form.

The stem 52 has a T-shaped passage 52a therein which vents passage 57a to the sump via passage 61 when the modulating valve is in the neutral or inoperative position shown in FIG. 1.

When the valve is actuated by pushing stem 52 inwardly (FIG. 2) so as to cause actuation of the clutch, the passage 52a moves inwardly in respect to the piston 56, thereby blocking passage 52a and permitting chamber 55 to be pressurized. Pressure in chamber 55 then forces piston 56 to the left, compressing springs 56a which in turn forces piston 54 against the end of the regulating spool 53.

As the piston 56 moves to the left, it passes at least partially over passage 52a thereby again opening passage 52a to cause a pressure drop through passage 52a. That pressure drop, is compared to the pressure drop through orifice 58 and the reaction of springs 56a, and the more the stem is pushed inwardly, the greater will be the control pressure delivered via outlet passage 62 to the centrifugal valve CV of the clutch.

Thus, the spool 53 meters the pressure to the clutch control valve CV via conduit 62. Metered clutch control pressure also feeds the left end of spool 53 via conduit 59, enabling the spool to be a pressure regulator for fluid in conduit 51, and at the same time meters off the drain to sump via conduit 60. Thereby, the operator can force stem 52 inwardly to the left to increase clutch control pressure, and outwardly to the right to reduce the control pressure in conduit 62 and consequently, the centrifugal valve CV.

Conduit 62 conducts this clutch control pressure fluid via radial ports 63, the two rifle drilled passages 64, radial passage 65 and to the annular groove 66 at the radially outer end of control valve CV.

The arrangement is such that the pressure fluid leaves valve MV by means of the conduit 62 at a pressure dependent on the position of the control stem 52. Valve MV is thereby manually controlled and regulates the flow of pressure in the system from the pump P to the centrifugal valve CV. The valve MV can be set so that the pressure of the modulating clutch is set from zero to the maximum amount of available pressure.

The centrifugally operated valve CV may be of the type shown in the U.S. Pat. No. 3,352,395, issued Nov. 14, 1967, specifically what is referred to as the two pressure system. It is believed sufficient to say that the control pressure which is introduced at the radially outer end of the radially shiftable valve element 72, acts in opposition to the centrifugal force imposed on the shiftable valve element 72 when the transmission is in operation. That is to say, centrifugal force tends to throw the shiftable valve element 72 in radial outer direction and the greater the speed of rotation, the greater will be the centrifugal force acting on the valve 72.

When the transmission is in operation, if the control pressure at the outer end of element 72 is great enough (as determined by the modulating valve) to overcome the centrifugal force on valve 72, that control pressure will force the valve element 72 in a radial inner direction (FIG. 2), thereby permitting the control pressure to flow through the hollow central portion of the valve element 72 and out the radial holes 75 of the valve, through passage 76 and into the clutch actuating chamber 16. In this manner, the centrifugal valve also acts to supply pressurized fluid to chamber portion 16. The amount of pressure fluid supplied by the control valve CV depends on the speed of rotation, and the function of the valve CV is to maintain the output rotational speed of the clutch constant.

The previously mentioned bleed orifices 36 and 37 provided in the clutch actuating chamber, also provides a constant bleed for the centrifugal valve CV. For this purpose, it will be noted that another bleed passage 93 places chamber 15 in communication with the radially inner end of a bore 94 in which the valve element 72 slides. A spring 96 is also provided in the bore 94 to bias the valve element 72 slightly to the radially outward position.

The pressure at the radially inner end of the centrifugal valve CV, (pressure that enters via passage 93) is always lower than the pressure on the radially outer end of the valve element 72 because of the throttling action, that is, the reduction of pressure as the fluid passes through ports 75 in the valve element 72 and into the annular groove 74 that communicates with port 76. This differential in pressure thereby provides 100 percent feed-back on the valve element 72.

When the control valve CV is being utilized for modulating purposes, the pressure in chamber portion 17 is dumped via ports 29, passages 28, and ports 27 through the valve 25. Ring 18 then shifts to the left (as viewed in FIG. 2) and chamber portion 16 is pressurized to the degree desired by the action of the centrifugal valve CV. Chamber portion 16 is prevented from being dumped through valve 25, because it is blocked by the spool of valve 25 as shown in FIG. 2.

Figure 3:
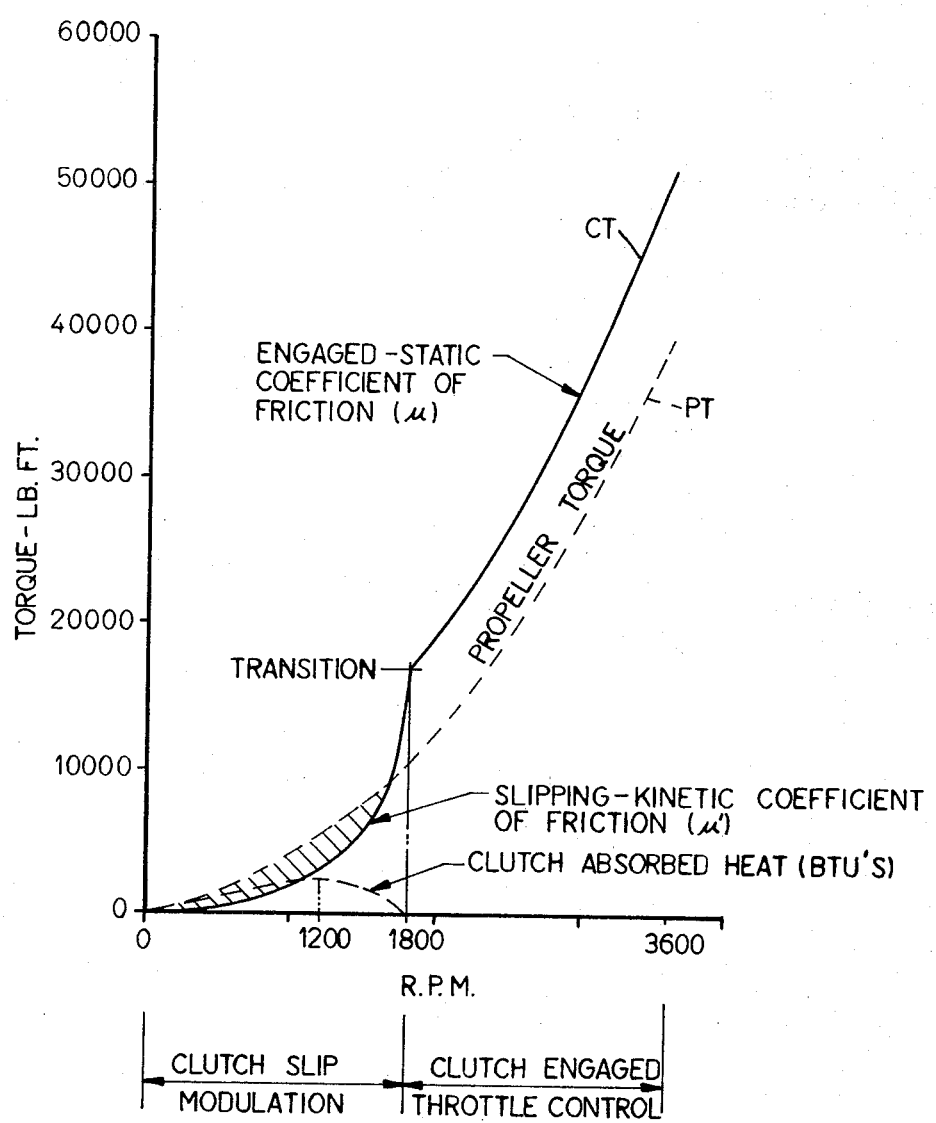
FIG. 3 is a graph showing the pattern of clutch torque and output shaft R.P.M.

The graph shown in FIG. 3 shows the centrifugal capacity of the clutch due to centrifugal force of the fluid. The graphs shows clutch torque and propeller torque plotted against output shaft R.P.M.

Both the propeller and the clutch body, that is the piston 10, containing the centrifugal valve CV, operate at a function of output shaft speed. Both the propeller and the centrifugal output shaft driven clutch have torque characteristics varying directly as the square of the output speed.

A plate clutch fully engaged has a high static coefficient of friction $\mu$ such as 0.10 to 0.18. The same clutch under dynamic or slipping operation will exhibit as low a kinetic coefficient of friction $\mu'$ as 0.02 to 0.06. The centrifugal torque capacity of the clutch with a fully filled actuating chamber can be designed to be above, equal to or less than the load (propeller) torque. FIG. 3 shows a clutch design in which engaged clutch torque OT exceeds propeller torque PT.

At any given speed the centrifugal torque capacity of the clutch without any pressurization or fluid supply from the pumps is capable of maintaining the load for a period of time until the bleed holes 36 and 37 reduce the fluid volume and lower the centrifugal clutch clamping force. When calling upon the clutch to slip continuously, this reduction is established. First the high horsepower selector valve 25 is actuated to shut off the supply of oil. Then oil bleeds out of both chambers 15 and 17. At some fluid level, clutch slippage occurs. The reduction in friction coefficient as well as the reduction of fluid level thus reduces clutch torque capacity, to thereby cause clutch slippage.

Actuating of the modulating valve MV refills actuating chamber 15. Although the centrifugal clamp force then resumes, the lowered friction coefficient demands clutch engagement to make up the different (shaded area in graph) between the propeller torque curve and the centrifugal head curve. The shaded area of the graph thus represents the amount of external pressure, from the pump, that is required to sustain a certain speed.

The FIG. 3 graph thus illustrates that the clutch will sustain the load and will continue to transmit power in the event one of the pumps becomes inoperative, for a significant time, for example, 33 seconds until the operative pump causes clutch clamp-up. The present invention permits the continuation of the full torque capacity, by centrifugal head of the fluid in chamber 15, in the event of a ruptured line or pump failure situation that requires axial shifting of the floating ring in the actuating chamber. The centrifugal head in the chamber is maintained for a relatively long period of time compared to the time required for axial shifting of the floating ring.

OPERATION

The general operation of the transmission is as follows. First the oil pumps would be started and if the selector valve 25 is in the neutral or blocked position, the pressure fluid is conducted via passage 48 into the clutch plate area and to the bearings.

The gas turbine engine 2 would then be started and the operator stem 52 of the modulating valve would be pushed inwardly to shift the valve spool 53 and causes pressure fluid to flow through conduit 62 to the centrifugal valve CV, which would permit the operator to modulate the clutch to any speed desired.

When it is then desired to go to full speed and for any sustained period of time, the operator would then simply push the spool 52 to the fully inward position and high pressure fluid then engages the clutch completely. The high horsepower selector valve 25, is then shifted to the position shown in FIG. 1 to thereby permit high pressure fluid to simultaneously go to chamber portions 16 and 17, causing full engagement of the clutch. High pressure fluid in chamber portion 16 also enters the port 93 and acts on the radially inner end of the shiftable separate valve element 72 causing it to be forced outwardly thereby closing holes 73 from communication with port 76. This renders the centrifugal valve CV inoperative during operation of the high horsepower selector valve 25.

I claim:

1. A power transmission having a rotatable input member, a rotatable output member, one of said members including a central shaft, a hydraulically actuated clutch of the annular interleaved disc type, which clutch is located between said rotatable members and around said shaft for forming a disengagable driving connection between said members, hydraulically actuated means for engaging said clutch and including (1) a radially extending member having a radially outer portion and also having a cylindrical central hub axially fixed on and around said shaft, and (2) an axially shiftable piston that sealingly slides against and relative to said outer portion, said piston and said radially extending member defining an expansible clutch engaging annular chamber; an annular ring within said annular chamber and axially shiftable therein, said ring located between and in sealing relationship with said central hub and said piston so as to define a clutch actuating first annular chamber portion and a clutch actuating second annular chamber portion, a separate source of pressure fluid for each chamber portion, and valve means for directing pressure fluid simultaneously to said annular chamber portions to cause axial shifting of said piston and consequent engagement of said clutch.

2. The transmission set forth in claim 1 including a centrifugal operated control valve located in said output member, and a fluid pressure modulating valve in pressure fluid delivering communication with said centrifugal valve, said centrifugal valve also being communicable with said actuating chamber whereby said modulating valve can direct fluid pressure to said centrifugal valve to cause pressurization of said chamber and modulated engagement of said clutch.

3. The transmission set forth in claim 1 including a fluid bleed orifice venting each of said chamber portions to atmosphere.

4. The transmission set forth in claim 2 including a fluid bleed orifice venting each of said chamber portions to atmosphere.

5. The transmission as claimed in claim 2 further characterized in that one of said separate sources of fluid also furnishes pressure fluid to said modulating valve.

6. A power transmission having an input member, an output member, a hydraulically actuated modulatable clutch located between said members for forming a disengagable driving connection therebetween, a hydraulic cylinder and piston assembly for actuating said clutch, said assembly including an axially shiftable piston and also including a cylinder which together form an expansible clutch actuating chamber, an annular ring within said chamber and axially shiftable therein so as to define a first chamber portion and a second chamber portion, a separate source of pressure fluid for each chamber portion, valve means for directing pressure fluid simultaneously for said chamber portions to cause axial shifting of said piston and consequent engagement of said clutch, a centrifugal operated control valve located in said output member, and a fluid pressure modulating valve in pressure fluid delivering communication with said centrifugal valve, said centrifugal valve also being communicable with said actuating chamber whereby said modulating valve can direct fluid pressure to said centrifugal valve to cause pressurization of said chamber and modulated engagement of said clutch.

7. The transmission set forth in claim 6 including a fluid bleed orifice venting each of said chamber portions to atmosphere.

8. The transmission as claimed in claim 6 further characterized in that one of said separate sources of fluid also furnishes pressure fluid to said modulating valve.

* * * * *